United States Patent [19]

Schwerdhöfer

[11] 4,349,342

[45] Sep. 14, 1982

[54] CHAIN SHIFTING DEVICE

[75] Inventor: Hans-Joachim Schwerdhöfer, Schweinfurt, Fed. Rep. of Germany

[73] Assignee: Fichtel & Sachs AG, Schweinfurt, Fed. Rep. of Germany

[21] Appl. No.: 128,401

[22] Filed: Mar. 10, 1980

[30] Foreign Application Priority Data

Mar. 27, 1979 [DE] Fed. Rep. of Germany ....... 2911970

[51] Int. Cl.³ .............................................. F16H 7/22
[52] U.S. Cl. ......................................... 474/80; 74/531
[58] Field of Search ....................... 474/80, 82; 74/531

[56] References Cited

U.S. PATENT DOCUMENTS

| | | | |
|---|---|---|---|
| 2,678,020 | 5/1954 | Jaeger | 74/531 X |
| 2,826,093 | 3/1958 | Draper | 74/531 X |
| 3,742,777 | 7/1973 | Mathauser | 474/82 |
| 3,974,707 | 8/1976 | Nagano | 474/82 |
| 4,012,966 | 3/1977 | Lieberman et al. | 74/531 |
| 4,231,264 | 11/1980 | Bergles | 474/80 |

Primary Examiner—Lawrence J. Staab
Attorney, Agent, or Firm—Toren, McGeady & Stanger

[57] ABSTRACT

In a chain shifting device for a bicycle or the like, a bicycle chain extending from the pedal crank can be shifted between the wheels of a chain wheel set positioned on a driven wheel. The chain is trained over the guide wheel and tensioning wheel of a chain guiding and tensioning member. A system of parts guides the chain guiding and tensioning mechanism between its different positions. The system of parts includes a movable joint block connected to the chain guiding and tensioning mechanism and a fixed joint block connected to the bicycle frame. An articulated lever and a guide member are connected by different joints to the movable and fixed joint blocks and are joined together by still another joint. A locking mechanism interlocks two of the parts of the system which are movable relative to one another for securing at least one position of the chain guiding and tensioning mechanism.

16 Claims, 11 Drawing Figures

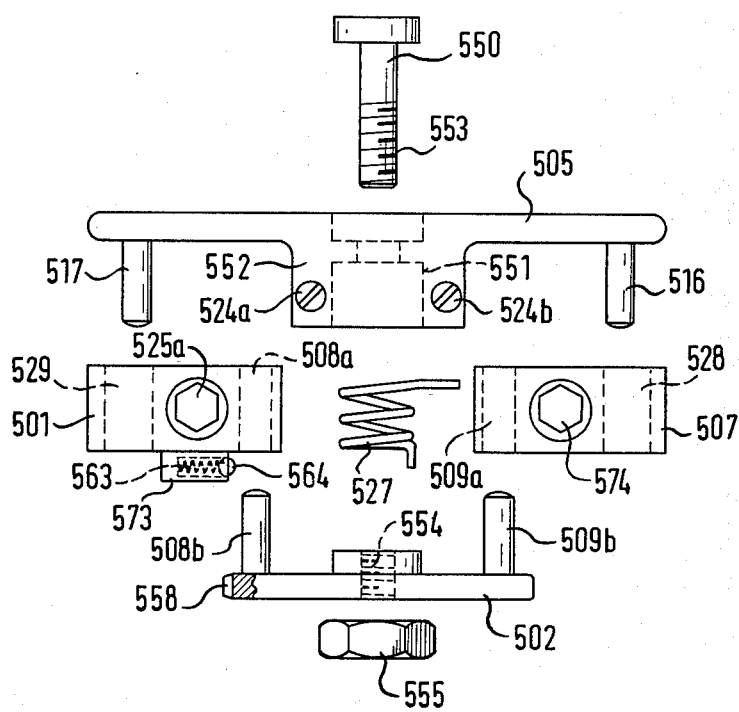

CHAIN SHIFTING DEVICE

SUMMARY OF THE INVENTION

The present invention is directed to a chain shifting device for bicycles or the like including a remote-controlled chain guiding and tensioning mechanism for shifting the chain between different positions each associated with a different wheel of a chain wheel set on the driven wheel of the bicycle. A system of parts guides the chain guiding and tensioning mechanism between its different positions. The system of parts includes a movable joint block fastened to the chain guiding and tensioning mechanism and another joint block fixed to the bicycle frame. In addition, the system includes an articulated lever connected by a first joint to the fixed joint block and by a second joint to the movable joint block. A guide member is connected to a third joint to the fixed joint block and by a fourth joint to the movable joint block. A fifth joint connects the articulated lever and the guide member together. Each of the joints permits pivotal movement and two of them are formed as sliding joints such as disclosed in U.S. patent application Ser. No. 936,569, filed Aug. 22, 1978 and now Patent No.

A chain shifting device of this type is the subject matter of U.S. patent application Ser. No. 074,816, filed Sept. 12, 1979.

In such a chain shifting device, the remote control can include a single cable line which effects the movement of the movable joint block against the force of a restoring spring. It is also possible to use two oppositely oriented cable lines for moving the movable joint block in opposite directions. Other remote control mechanisms are also possible.

Though the remote control can be effected in various ways, the problem frequently occurs that the positions of the movable joint block cannot be fixed as exactly as would be required for moving the chain in the best possible manner to a selected chain wheel.

Therefore, the primary object of the present invention is to provide a chain shifting device of the above described type so that at least certain positions of the movable joint block for moving the chain between the different wheels of the chain wheel set can be selected exactly each time the chain is shifted with the parts effecting the shifting being secured against relative movement. This object is provided by as simple a means as is possible.

In accordance with the present invention a locking mechanism is provided between two parts of the system guiding the chain guiding and tensioning mechanism between its different positions. These two parts are movable relative to one another. The parts of the system consist of a fixed joint block, a movable joint block, and articulated lever and a guide member. The locking mechanism permits these parts to be locked in at least one position, but preferably several or, in the optimum arrangement, in all of the relative positions corresponding to each of the wheels of the chain wheel set.

A known locking device is disclosed in German Auslegeshrift No. 25 21 043 for use with a different type of guide system for the chain guiding and tensioning mechanism.

As disclosed in the above mentioned U.S. patent application Ser. No. 074,816, the third and fourth joints of the system of parts are sliding joints with the remaining joints being secured at fixed points. A fixed point joint is one in which the two parts are connected together in an articulated or pivotal manner but are held against any other movement. Sliding joints, however, are joints in which the interconnected parts can be pivoted relative to one another and are also slidable or displaceable. As is obvious, the axes of all of the joints are essentially parallel to one another.

Another feature of the system is that the articulated lever and the guide member are joined together between the fixed joint block and the movable joint block by the fifth joint so that the articulated lever and joint member cross one another.

As proposed in U.S. patent application Ser. No. 074,816, in a preferred embodiment, the guide member has a greater length than the articulated lever so that the distances between the fifth joint and the third and fourth joints are greater than the distances between the fifth joint and the first and second joints.

In accordance with the present invention, a particularly simple and operationally strong design is provided with the articulated lever and the guide member extending between the two joint blocks. Such an arrangement has been proven to be particularly suitable. In one arrangement in accordance with the present invention, the locking mechanism interlocks a hub on the guide member with a disc fitted into a recess in the articulated lever.

Preferably, the locking mechanism is constructed as a spring-operated device which, when a predetermined actuating force is exceeded, releases the guiding movement of the chain guiding and tensioning mechanism. When two cable lines are used as the actuating means, it must be assured that the cable lines and the corresponding hand switches are built strong enough to be able to apply the predetermined actuating force. When the actuating force is effected over a single cable line and the return is provided by means of a restoring spring, the restoring spring and the locking mechanism must, of course, be adjusted relative to one another so that the restoring spring is able to overcome each of the positions of the locking mechanism when the cable line is released.

When the chain shifting device is placed on a bicycle, tolerances may occur in the bicycle, in the chain shifting device and at the interface between the bicycle and the chain shifting device. Due to such tolerances, the position of the movable joint block and, thus, of the chain shifting and tensioning mechanism in the different locking positions may not correspond to the optimum position for moving the chain onto the corresponding chain wheel. Accordingly, to move the movable joint block and thereby the chain shifting and tensioning mechanism into the optimum position, in accordance with the present invention two locking mechanism parts are arranged movable relative to one another and at least one part is movably and adjustably arranged relative to a corresponding part of the system. The adjustments and fixed positioning of the movable locking mechanism part can be effected by forming teeth on such part with a screw supported in the corresponding part of the system, and in engagement with the teeth.

The locking mechanism can be formed of parts movable relative to one another with one part having locking recesses and the other having at least one locking projection which is biased for resilient engagement in the locking recesses. The locking projections can be balls or profiled wedges guided in ducts or blind bores and biased by springs located in the bores.

If one of the locking mechanism parts is to be adjustable relative to the corresponding part of the system, it is preferred to utilize the part incorporating the locking recesses because it requires little space.

The locking mechanism can be positioned between each pair of parts of the system which are movable relative to one another. The parts of the system consist of the fixed joint block, the movable joint block, the articulated lever and the guide member. Preferably, the locking member is arranged, however, at the location of a fixed joint. Accordingly, it is preferable if the locking mechanism is assigned to one of the first, second or fifth joints, as described above. With regard to its function and the space required, the most advantageous arrangement of the locking mechanism is considered to be between the articulated lever and the guide member, that is, in the region of the fifth joint. In one embodiment, a disc containing the locking recesses is positioned in a sandwich-like manner between the hub members of the articulated lever and the guide member so that the disc is adjustable and can be fixed relative to these parts. In addition, at least one locking projection is provided in the other hub member, that is, the hub member which does not hold the disc. In another embodiment, a locking projection is provided in the end face of at least one joint pin which is rigidly connected to the articulated lever with corresponding locking recesses formed in a disc which bears on and is rotatable and adjustable relative to the guide member.

When the locking mechanism is located in the region of the first or second joints, that is, between the articulated lever and the fixed or movable joint block, the locking mechanism can be provided with a locking projection which is biased radially in relation to the joint axis.

In accordance with the present invention, it is also possible to locate the locking mechanism between the guide member and one of the fixed or movable joint blocks in the region of the third or fourth joints which are the sliding joints. In this embodiment, however, the arrangement of the locking recesses is more difficult because they are not located on a circle around a corresponding joint axis. These difficulties can be avoided by forming the locking recesses in the radial direction with a greater length than the length corresponding to the radial extension of the locking projections. As a result, no problems are encountered if, for example, the locking mechanism part which receives the locking recesses is also capable of being adjusted and fixed in position.

In accordance with the present invention, it is particularly suitable to manufacture the parts of the system of a pressure-cast light alloy. To eliminate wear of the pressure-cast parts caused by the locking action, it is suggested that any part of the system, which is susceptible to wear if it is made of a light metal or alloy and forms the engaging surfaces of such parts, should be formed of a hard material such as steel.

Though only limited space is available, to avoid positioning the locking members too close together, it is suggested that the locking mechanism has on its interengaging parts a plurality of engaging members so that one engaging member on one part only engages a member on the other part in a given position of the chain shifting and tensioning mechanism.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 11 is another embodiment of the present invention shown in an exploded side view with the locking mechanism located between a joint block and the articulated lever, that is, in the region of the first or second joint.

DETAIL DESCRIPTION OF THE INVENTION

Figure 1:
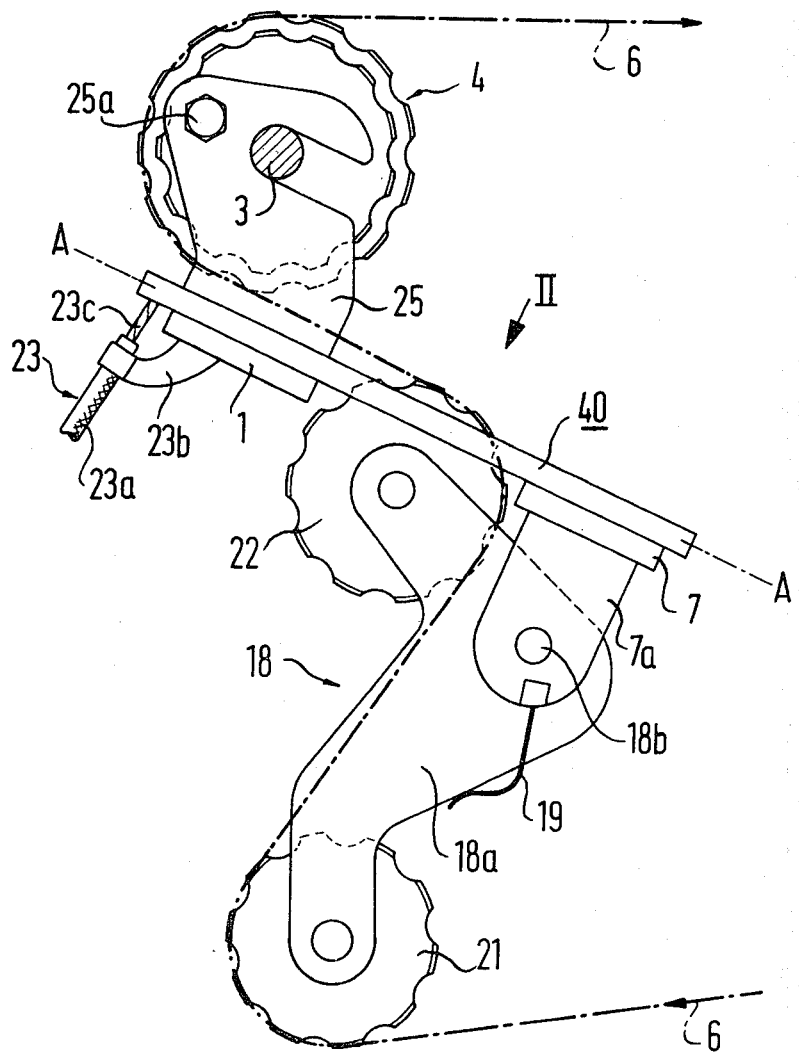
FIG. 1 is a schematic side view of a chain shifting device for a bicycle.

In FIG. 1 only the rear wheel axle 3 of a bicycle is shown with a chain wheel set 4 mounted on the axle. A plate 25 is secured on the rear wheel axle 3 and is attached by means of a screw 25a to the frame of the bicycle, not shown. A joint block 1 is fixed to the plate 25. Lever system 40, shown schematically as a box, is connected between joint block 1 and another joint block 7. Carrier plate 7a is secured to the joint block 7. Chain guiding and tensioning mechanism 18 includes a carrier 18a supported on the carrier plate 7a. Carrier 18a is pivotally supported about a pivot pin 18b. A tensioning wheel 21 and a guide wheel 22 are rotatably mounted on the carrier 18a. A chain 6 extends from the pedal crank chain wheel, not shown, over the tensioning wheel 21, the guide wheel 22 and then around a selected one of the wheels of the chain wheel set 4 before returning back to the pedal crank chain wheel.

To shift the chain 6 to a different one of the chain wheels of the chain wheel set 4, the entire chain guiding tensioning mechanism 18 is adjustable perpendicularly to the plane of FIG. 1 so that during adjustment movement perpendicular to the plane of the figure, the chain guiding and tensioning mechanism 18 remains parallel to itself and to the plane of the figure.

Chain guiding and tensioning mechanism 18 includes a tension spring 19 in contact with the carrier 18a and arranged to pivot the carrier about the pivot pin 18b in the clockwise direction as viewed in FIG. 1. Accordingly, the chain 6 is always kept under tension whether it runs over a smaller one or a larger one of the chain wheels in the chain wheel set 4.

Chain guiding and tensioning mechanism 18 is guided perpencicularly to the plane of FIG. 1 through the lever system 40 and the lever system is movable or deformable in a plane extending perpendicularly to the plane of FIG. 1 as indicated by the line A—A. Movement of the lever system is effected by a cable line 23 having a jacket 23a supported from the joint block 1 fixed to the frame by an arm 23b while the cable 23c in the cable line acts on the lever system 40.

The present invention is directed in particular to the lever system 40 shown only schematically as a box in FIG. 1.

Figure 2:
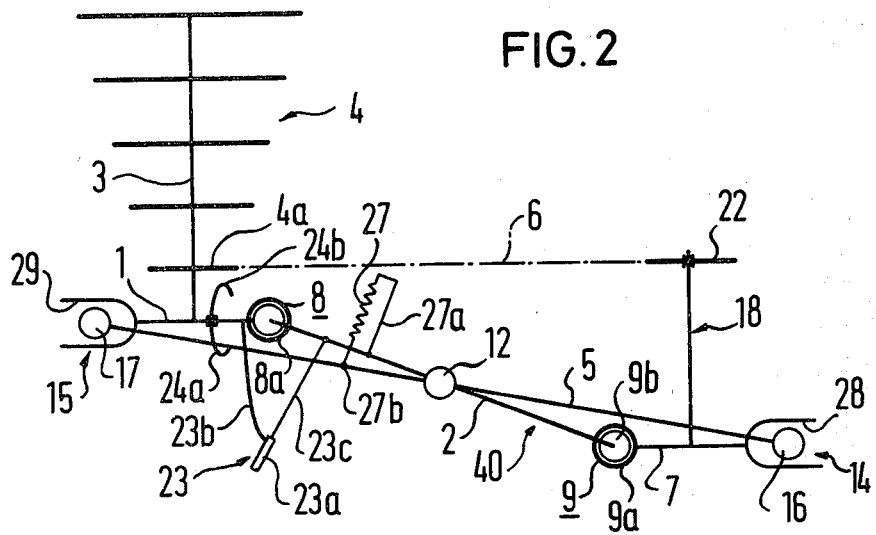
FIG. 2 is a view of the chain shifting device taken in the direction of the arrow II of FIG. 1, in a first operating position of the device.
Figure 3:
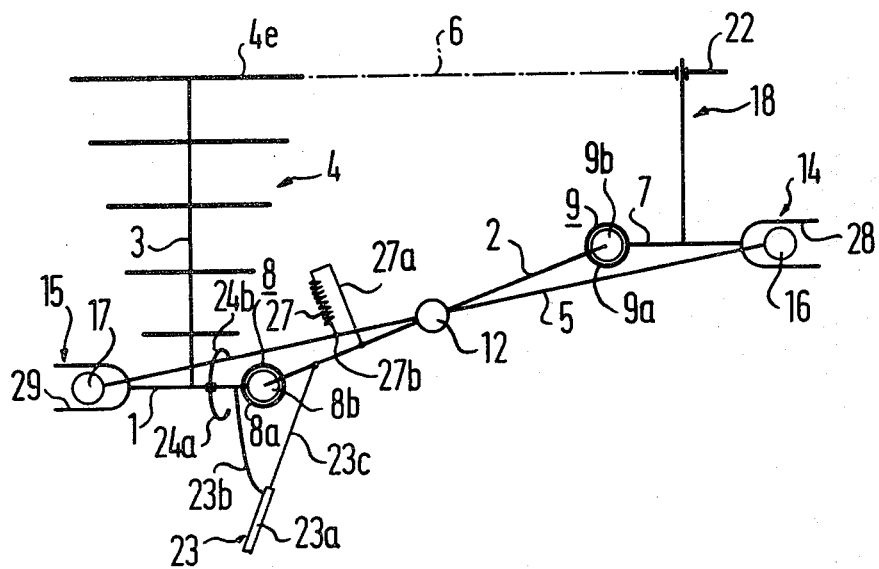
FIG. 3 is a view similar to FIG. 2, however, illustrating a second operating position of the device.

In FIGS. 2 and 3 the rear wheel axle 3 is shown with the chain wheel set 4 mounted on it and with the chain 6 extending between one of the chain wheels of the set and the guide wheel 22 of the chain guiding and tensioning mechanism 18. Cable line 23 along with its cable line jacket 23a is fastened to the fixed joint block 1 through the arm 23b and by the cable 23c it is attached to the lever system 40. The movable joint block 7 is also shown and it carries the chain guiding and tensioning mechanism 18. For the sake of simplicity, only the guide wheel 22 of the chain guiding and tensioning mechanism 18 is illustrated. Finally, a lever system 40 is shown and it is displaceable or movable in the plane of FIGS. 2 and 3. The plane of FIGS. 2 and 3 corresponds to the plane A—A in FIG. 1. In FIG. 2, the chain guiding and tensioning mechanism 18 and, accordingly, the guide wheel 22 are in the position with the chain 6 trained over the smallest chain wheel 4a of the chain wheel set 4. In FIG. 3, the chain guiding and tensioning mechanism 18 and its guide wheel 22 are in the position with the chain 6 trained over the largest chain wheel 4e of the chain wheel 7. From these two figures it can be appreciated that the chain guiding and tensioning mechanism 18 with its guide wheel 22 in the position of FIG. 3 has been moved basically parallel to its position in FIG. 2.

The following is a description of the lever system 40 which effects the guidance of the chain guiding and tensioning mechansim between the position of FIG. 2 and the position of FIG. 3 along with the intermediate positions therebetween.

Lever system 40 is made up of an articulated lever 2 supported in an articulated manner on the fixed joint block 1 by a first joint 8, that is, a fixed-point joint formed by a bore 8a in the joint block 1 and a joint pin 8b on the articulated lever. The opposite end of the lever is connected in an articulated manner to the movable joint block 7 by a second joint 9, that is, a fixed-point joint formed by a bore 9a in the joint block 7 and a joint pin 9b on the articulated lever 2. The axes of the joints 8 and 9 extend perpendicularly to the plane of FIG. 2 and, therefore, perpendicular to the plane A—A in FIG. 1. Further, lever system 40 includes a guide member 5 connected to the articulated lever 2 through a joint 12 (referred to in the following text as the fifth joint). The interconnection between the guide member 5 and the articulated lever 2 is located between the ends of each of the two parts of the lever system. The axis of joint 12 also extends perpendicularly to the plane of FIG. 2 and, therefore, to the plane A—A of FIG. 1. At its left end as viewed in FIG. 2, guide member 5 is supported in a pivotal or articulated manner and also in a shiftable or movable manner in a third joint 15 on the fixed joint block 1. In other words, the third joint 15 is a sliding joint as distinguished from a fixed-point joint. The sliding joint 15 is formed by a joint pin 17 fixed on the guide member 5 so that it is pivotally mounted in an oblong hole 29 in the joint block 1. In addition, the pin is slidably supported in the oblong hole 29. The axis of the joint pin is perpendicular to the plane of FIG. 2 and, therefore, to the plane A—A of FIG. 1. The oblong hole extends in its longitudinal direction or sliding direction in a plane essentially perpendicular to the rear wheel axle 3. The right-hand end of the guide member 5 as viewed in FIG. 2 is guided in a fourth joint 14 in the movable joint block 7. The fourth joint 14 is also a sliding joint, similar to the third joint 15. The fourth or sliding joint 14 includes an oblong hole 28 in the joint block 7 and a joint pin 16 on the guide member 5 located within the oblong hole. The axis of the joint pin 16 extends perpendicularly to the plane of FIG. 2 and, therefore, perpendicularly to the plane A—A of FIG. 1. The joint pin 16 can be pivoted about its axis in the oblong hole 28 and it can also be moved in the longitudinal direction of the oblong hole 28. The longitudinal direction of the oblong hole is essentially parallel to the plane of the guide wheel 22. As viewed in these figures, the articulated lever 2 and the guide member 5 are arranged one over the other in adjacent parallel planes perpendicular to the plane of the figures, so that they can be rotated about the fifth joint 12 without interfering with one another. Therefore, the lever system 40 consisting of the articulated lever 2 and the guide member 5 can be moved back and forth between the position of FIG. 2 and the position of FIG. 3 and the intermediate positions represented by the other chain wheels of the chain wheel set 4.

In FIG. 2, the position of the lever system is determined by a stop member 24a. Stop member 24a is fastened on the joint block 1. In FIG. 2, the guide member 5 bears against the stop member 24a. In FIG. 3, the position of the lever system 40 is determined by another stop member 24b also fastened to the fixed joint block 1. In FIG. 3, guide member 5 bears against the stop member 24b. The two stop members 24a and 24b can be constructed as adjusting screws so that the end positions of the lever system can be adjusted.

In the position shown in FIG. 3, the lever system 40 is biased by a spring 27. Spring 27 is located between the spring support 27a fastened on the articulated lever 2 and a fastening point 27b on the guide member 5 so that the spring tends to displace the lever system into the end position illustrated in FIG. 3. To transfer the lever system 40 from the position displayed in FIG. 2 to the position displayed in FIG. 3, it is only necessary to pull the cable 23c.

Instead of the schematically illustrated helical tension spring 27, it is also possible to use a torsion spring wound around the fifth joint 12 with one end of the spring acting on the articulated lever 2 and its other end acting on the guide member 5. Because of its torsion effect, the spring tends to move the articulated lever and the guide member into the position shown in FIG. 3.

It can be seen that the lever system 40 results in an arrangement where the projection of the lever system perpendicular to the plane of the chain is very small and this is a desirable feature for the space-saving mounting of the chain shifting device on a bicycle. From FIGS. 2 and 3 it can be appreciated that the spring 27 is extended only for an insignificant amount during movement between the two end positions. This means that the change of force of the spring is also insignificant. This is desirable, since an approximately constant force must be applied on the cable line for shifting the lever system from the position in FIG. 3 to the position in FIG. 2.

Figure 4:
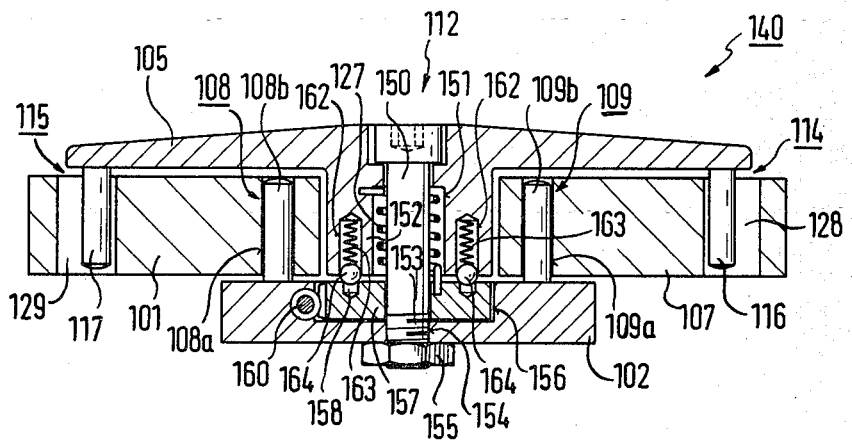
FIG. 4 is a longitudinal sectional view taken through a lever system embodying the present invention with the locking mechanism being located in the region of the fifth joint.
Figure 6:
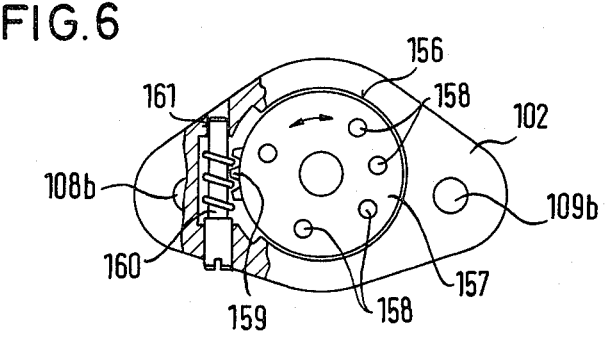
FIG. 6 is a plan view, partly in section, of the articulated lever and the parts of the locking mechanism associated with the lever, in the embodiment illustrated in FIGS. 4 and 5.
Figure 5:
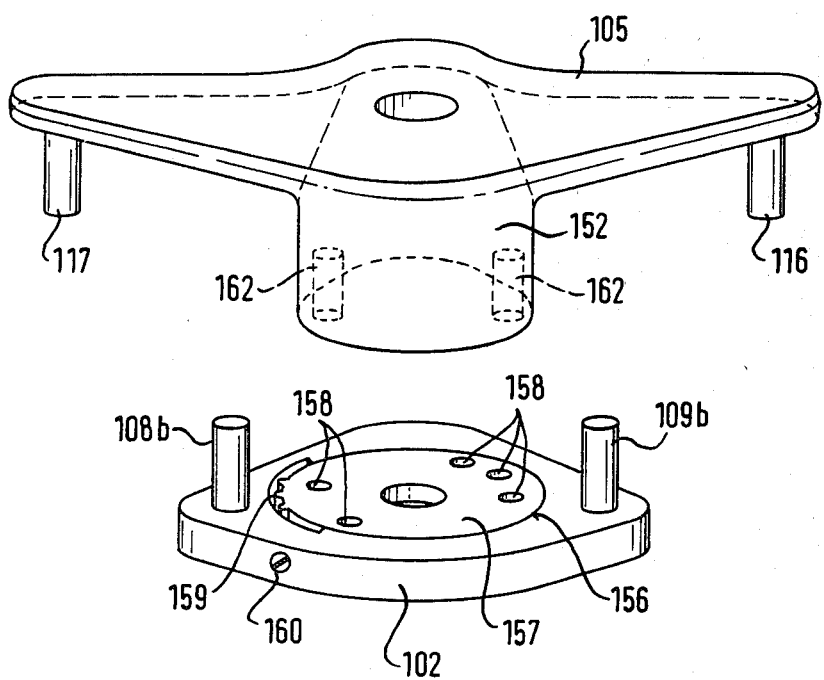
FIG. 5 is an exploded perspective view of the lever system shown in FIG. 4 with the joint blocks omitted.

In the embodiment illustrated in FIGS. 4 to 6, similar parts are provided with the same reference numerals as in the schematic illustration in FIGS. 1 to 3 but increased by the number 100.

In the embodiment displayed in FIGS. 4 to 6, the fifth joint 112 is formed by a threaded bolt 150 which extends through a bore 151 in a hub 152 of guide member 105 and is screwed into a thread 153 formed in a bore 154 of the articulated lever 102. The end of the bolt extending through the articulated lever 102 is secured by a nut 155. A recess 156 is formed in the surface of the articulated lever 102 facing toward the guide member 105 and a disc 157 containing locking recesses 158, note FIG. 6, is positioned within the recess 156. The disc 157 has five locking recesses 158. On its circumferential periphery, the disc 157 is provided with adjusting teeth 159. An adjusting screw 160, supported in a bore 161 in the articulated lever 102, is in engagement with the adjusting teeth 159. Accordingly, the disc 157 can be rotated about the axis of the fifth joint 112 by means of the adjusting screw 160. In the hub 152 of the guide member 105 on opposite sides of the bolts 150, two axi-parallel blind bores 162 are provided with the openings of the bores facing toward the disc 157. Each blind bore 162 contains a helical compression spring 163 biasing a ball 164 out of the blind bore. The balls 164 form locking projections when brought into engagement with the locking recesses 158. The two locking balls or projections 164 and the five locking recesses 158 define five shifting positions in accordance with the five chain wheels 4a-4e of the chain wheel set 4 over which the chain 6 runs, note FIGS. 2 and 3. In each position of the articulated lever 2 relative to the guide member 105, only one of the locking projections 164 is in locking engagement with one of the locking recesses 158. By adjusting the screw 160, it can be assured that in any of the positions defined by the locking projections 164 and the locking recesses 158, the chain guiding and tensioning mechanism supported by the movable joint block 107 is in the correct position relative to the corresponding chain wheel of the chain wheel set 4.

In FIGS. 4 to 6, the spring 27 in FIGS. 2 and 3 is replaced by a torsion spring 127 located within the bore 151 and acting at one end indirectly on the articulated lever 102, and on its other end on the guide member 105. The exploded view of FIG. 5 shows, even more clearly, the arrangement of the articulated lever 102 and the guide member 105.

Figure 7:
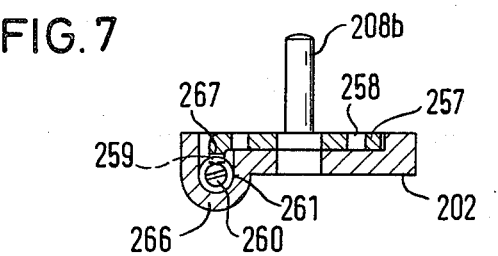
FIG. 7 is another embodiment of the adjustable disc containing the locking recesses of the locking mechanism.

In another embodiment of the articulated lever 202 illustrated in FIG. 7, similar parts are provided with the same reference numerals as in FIGS. 4 to 6, however, each number is increased by 100.

FIG. 7 affords a sectional view through the articulated lever 202, however, this section is taken in a sectional plane spaced 90° relative to the sectional plane of FIG. 4. In this embodiment, articulated lever 202 has a downwardly extending projection 266 with a hollow interior forming a duct 261 for adjusting screw 260. Adjusting screw 260 is in engagement with teeth 259 located on the edge of a lug 267 bent downwardly from the disc 257. Locking recesses 258 are formed in the disc 257.

Figure 8:
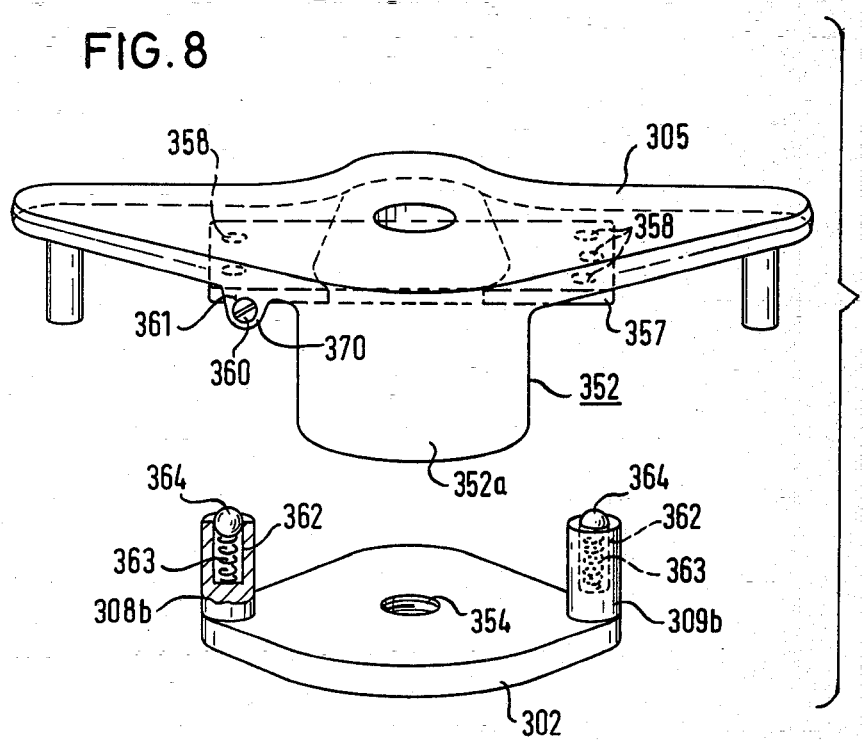
FIG. 8 is an exploded perspective view of another embodiment of the present invention with the locking mechanism located in the region of the fifth joint.

In FIG. 8, similar parts are provided with the same reference numerals as in FIGS. 4 to 6, however, each reference number is increased by 200.

Figure 9:
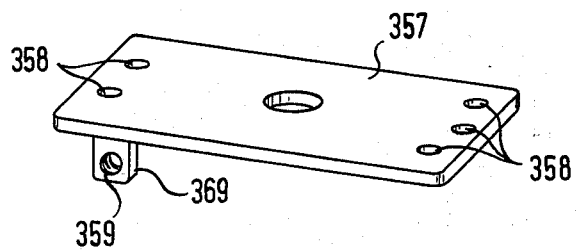
FIG. 9 is a detail view of a part of the locking mechanism shown in FIG. 8.

The embodiment disclosed in FIGS. 8 and 9 differs from the one in FIGS. 4 to 6 in that the ducts or blind bores 362 holding the helical compression springs 363 and the balls 364 forming the locking projections, are arranged in joint pins 308b and 309b projecting outwardly from one face of the articulated lever 302. The disc 357 is positioned in a slot between the two parts of the forked hub 352. The disc 357 is rectangular in shape, as can be seen in FIG. 9. The disc 357 has a downwardly projecting lug 369 containing a threaded bore 359 in which the adjusting screw 360 engages. Adjusting screw 360 is supported in a projection 370 on the bottom side of the guide member 305. Further, in this embodiment, by means of the locking balls or projections 364 and the locking recesses 358, five different positions of the articulated lever 302 and of the guide member 305 can be selected relative to one another. By means of the adjusting screw 360 the positions can be aligned with chain wheels 4a through 4e as shown in FIGS. 2 and 3.

Figure 10:
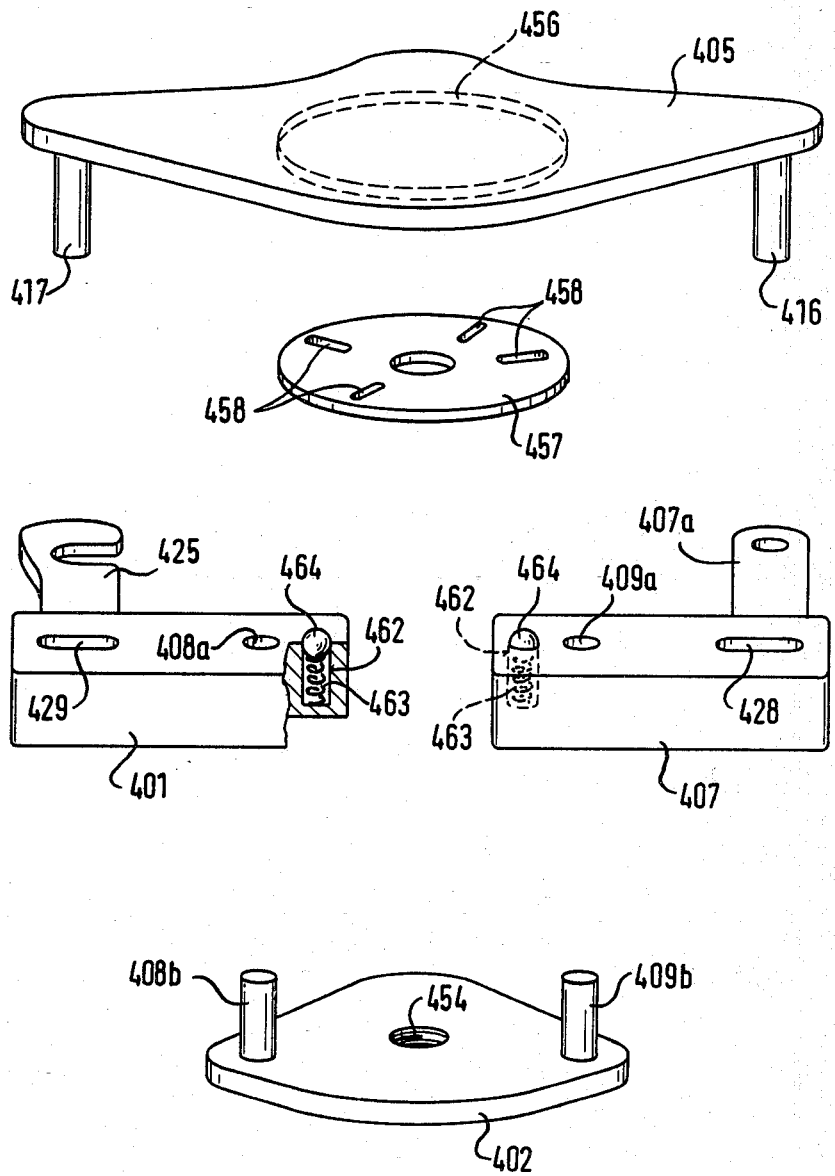
FIG. 10 is another embodiment of the present invention shown in an exploded perspective view with the locking mechanism located between the guide member and the joint blocks, that is, at one of the sliding joints.

In FIG. 10 similar parts are provided with the same reference numerals as in FIGS. 4 to 6, however, the numerals have been increased by 300.

In the embodiment of FIG. 10, a recess 456 for the disc 457 is provided on the lower side of the guide member 405, note the dotted lines shown in the guide member. The adjusting device for the disc with the locking recesses is not illustrated in FIG. 10. The device is similar to the one illustrated in FIGS. 4 to 6. The locking mechanism is provided between the guide member 405 and the fixed joint block 401 and movable joint block 407. Since the guide member 405 does not perform pure rotational movement, but a combination of rotational and sliding movements with respect to the joint blocks 401 and 407, the locking recesses 458 formed in the disc 457 have an oblong shape. Balls 464 which form the locking projections are each arranged within a blind bore 462 in the joint blocks 401 and 407. Springs 463 within the blind bores 462 bias the locking balls or projections 464 outwardly toward the locking recesses 458. The two locking balls or projections 464 and the four locking recesses 458, in combination, define four positions so that in each position only one of the locking projections 464 engages a locking recess 458.

In FIG. 11 another embodiment is shown with similar parts having the same reference numerals as in the embodiment in FIGS. 4 to 6, however, each numeral is increased by 400.

In FIG. 11, in an attachment 573 projecting downwardly from the fixed joint block 501, a helical compression spring 563 is guided within a blind bore and biases a ball 564 which serves as a locking projection. This ball or locking projection 564 interacts with locking recesses 558 located on the lateral periphery of the articulated lever 502. The recesses 558 are located along a circular arc extending around the joint pin 508b. Accordingly, in this embodiment, the locking mechanism is positioned between the fixed joint block 501 and the articulated lever 502.

FIG. 11 shows in a schematic manner that the adjustable stop members which in FIGS. 2 and 3 are arranged on the same fixed joint block 501, can also be arranged on the hub 552 of the guide member 505. The stop members are adjusting screws 524a and 524b. A screw 525a fastens the joint block 501 to the bicycle frame. A screw 574 fastens the chain guiding and tensioning device to the movable joint block 507. The joint pins 508b, 509b, 516, and 517, are formed integrally with the articulated lever 502 or the guide member 505, respectively.

While specific embodiments of the invention have been shown and described in detail to illustrate the application of the inventive principles, it will be understood that the invention may be embodied otherwise without departing from such principles.

What is claimed is:

1. A chain shifting device for bicycles or the like having a remote-controlled chain guiding and tensioning mechanism having a number of positions so that in each position the chain can be shifted to a different chain wheel of a chain wheel set comprising a system including a movable joint block arranged to be connected to the chain guiding and tensioning mechanism, a fixed joint block arranged to be fixed to the bicycle frame, an articulated lever and a guide member guiding said movable joint block on said fixed joint block, a first joint connecting said articulated lever to said fixed joint block, a second joint connecting said articulated lever to said movable joint block, a third joint connecting said guide member to said fixed joint block, a fourth joint connecting said guide member to said movable joint block, a fifth joint connecting said articulated lever and guide member together between said fixed joint block and movable joint block, each of said first, second, third, fourth and fifth joints being rotatable and two of said joints each being slidable in a direction extending transversely of the axis of rotation of said joint, wherein the improvement comprises locking means for interlocking two parts of said system which are movable relative to one another for securing at least one position of the chain guiding and tensioning mechanism, said locking means comprises a spring-operated locking mechanism which releases the guiding movement of the chain guiding and tensioning mechanism when a predetermined actuating force is exceeded, said locking mechanism comprises a first locking part and a second locking part with said locking parts being movable relative to one another, and at least one said locking part arranged to be movable and adjustable relative to one of said articulated lever and guide member, said one locking part comprising a disc member having teeth formed in the circumferential periphery of said disc, and a screw position in the one of said articulated lever and guide member relative to which said one locking part is movable with said screw engageable with said teeth.

2. A chain shifting device for bicycles or the like having a remote-controlled chain guiding and tensioning mechanism having a number of positions so that in each position the chain can be shifted to a different chain wheel of a chain wheel set comprising a system including a movable joint block arranged to be connected to the chain guiding and tensioning mechanism, a fixed joint block arranged to be fixed to the bicycle frame, an articulated lever and a guide member guiding said movable joint block on said fixed joint block, a first joint connecting said articulated lever to said fixed joint block, a second joint connecting said articulated lever to said movable joint block, a third joint connecting said guide member to said fixed joint block, a fourth joint connecting said guide member to said movable joint block, a fifth joint connecting said articulated lever and guide member together between said fixed joint block and movable joint block, each of said first, second, third, fourth and fifth joints being rotatable and two of said joints each being slidable in a direction extending transversely of the axis of rotation of said joint, wherein the improvement comprises locking means for interlocking two parts of said system which are movable relative to one another for securing at least one position of the chain guiding and tensioning mechanism, said locking means comprises a spring-operated locking mechanism which releases the guiding movement of the chain guiding and tensioning mechanism when a predetermined actuating force is exceeded, said locking mechanism comprises a first part and a second locking part with said locking parts being movable relative to one another, and at least one said locking part arranged to be movable and adjustable relative to one of said articulated lever and guide member, one of said locking parts of said locking mechanism comprises locking recesses and said other locking part comprises at least one directionally biased locking projection for resilient engagement in said locking recesses, said articulated lever having a recess therein, said locking part containing said locking recesses being located in the recess in said articulated lever, and said locking part being adjustable relative to said articulated lever.

3. A chain shifting device for bicycles or the like having a remote-controlled chain guiding and tensioning mechanism having a number of positions so that in each position the chain can be shifted to a different chain wheel of a chain wheel set comprising a system including a movable joint block arranged to be connected to the chain guiding and tensioning mechanism, a fixed joint block arranged to be fixed to the bicycle frame, an articulated lever and a guide member guiding said movable joint block on said fixed joint block, a first joint connecting said articulated lever to said fixed joint block, a second joint connecting said articulated lever to said movable joint block, a third joint connecting said guide member to said fixed joint block, a fourth joint connecting said guide member to said movable joint block, a fifth joint connecting said articulated lever and guide member together between said fixed joint block and movable joint block, each of said first, second, third, fourth and fifth joints being rotatable and two of said joints each being slidable in a direction extending transversely of the axis of rotation of said joint, wherein the improvement comprises locking means for interlocking two parts of said system which are movable relative to one another for securing at least one position of the chain guiding and tensioning mechanism, said third and fourth joints are slidable joints and said first, second and fifth joints are fixed-point joints, said locking means being located between said articulated lever and said guide member, said locking means comprises a disc having locking recesses therein positioned in a sandwich-like manner between said articulated lever and said guide member and said disc being adjustable and fixedly positionable relative to one of said articulated lever and said guide member, and said locking means includes at least one locking projection positioned in the other one of said articulated lever and guide member and being engageable in said locking recesses in said disc.

4. A chain shifting device for bicycles or the like having a remote-controlled chain guiding and tensioning mechanism having a number of positions so that in each position the chain can be shifted to a different chain wheel of a chain wheel set comprising a system including a movable joint block arranged to be connected to the chain guiding and tensioning mechanism, a fixed joint block arranged to be fixed to the bicycle frame, an articulated lever and a guide member guiding said movable joint block on said fixed joint block, a first joint connecting said articulated lever to said fixed joint block, a second joint connecting said articulated lever to said movable joint block, a third joint connecting said guide member to said fixed joint block, a fourth joint connecting said guide member to said movable joint block, a fifth joint connecting said articulated lever and guide member together between said fixed joint block and movable joint block, each of said first, second, third, fourth and fifth joints being rotatable and two of said joints each being slidable in a direction extending transversely of the axis of rotation of said joint, wherein the improvement comprises locking means for interlocking two parts of said system which are movable relative to one another for securing at least one position of the chain guiding and tensioning mechanism, said third and fourth are slidable joints and said first, second and fifth joints are fixed-point joints, said locking means being located between said articulated lever and said guide member, said first joint comprises a first joint pin, said second joint comprises a second joint pin, said locking means comprises a locking projection positioned in each of said first joint pin and second joint pin, said first and second joint pins being rigidly connected to said articulated lever, and said locking means includes a disc having locking recesses with said disc bearing against said guide member with said locking recesses facing toward said first and second joint pins and said locking projections in said first and second joints pins being engageable in said locking recesses, and said disc rotatable and adjustable relative to said guide member.

5. A chain shifting device, as set forth in claim 1 or 2, wherein said third and fourth joints are slidable joints and said first, second and fifth joints are fixed-point joints.

6. A chain shifting device, as set forth in claim 5, wherein the distances of said third and fourth joints from said fifth joint are greate than the distances of said first and second joints from said fifth joint.

7. A chain shifting device, as set forth in claim 6, wherein in the direction of the axes of said joints, said fixed joint block and said movable joint block are arranged between said articulated lever and said guide member.

8. A chain shifting device, as set forth in claim 7, wherein said first and second joints are formed as joint pins rigidly connected to said articulated lever, said third and fourth joints are formed as joint pins rigidly connected to said guide member, said fixed joint block having a bore therein for receiving said first joint pin and said movable joint block having a bore therein for receiving said second joint pin, said fixed joint block having an oblong hole formed therein for receiving said third joint pin and said movable joint block having an oblong hole therein for receiving said fourth joint pin.

9. A chain shifting device, as set forth in claim 8, wherein said first and second joint pins being formed integrally with said articulated lever and said third and fourth joint pins being formed integrally with said guide member.

10. A chain shifting device, as set forth in claim 8, wherein said fifth joint comprises a connecting bolt, said connecting bolt extending through said guide member and said articulating lever, and said fixed joint block and said movable joint block each being positioned between said articulated lever and said guide member.

11. A chain shifting device, as set forth in claim 10, wherein a biasing spring is located about said fifth joint and is arranged for displacing said articulated lever relative to said guide member in a direction toward a particular position of the chain guiding and tensioning mechanism.

12. A chain shifting device, as set forth in claim 11, wherein one of said articulated lever and said guide member having a hub formed integrally therewith with said connecting bolt extending through said hub, and said biasing spring positioned within said hub and encircling said connecting bolt.

13. A chain shifting device, as set forth in claim 2, wherein said locking projections comprise balls positioned in blind bores and locking springs located in the blind bores for biasing said balls outwardly from said blind bores.

14. A chain shifting device, as set forth in claim 5, wherein said locking means being located in locking engagement between said guide member and at least one of said fixed joint block and said movable joint block.

15. A chain shifting device, as set forth in claim 1, 2, 3 or 4, wherein at least parts of said system being formed of light metal and engaging surfaces of said light metal parts being formed of a hard material.

16. A chain shifting device, as set forth in claim 15, wherein said hard material is steel.

* * * * *